US010146694B1

(12) United States Patent
Laier et al.

(10) Patent No.: US 10,146,694 B1
(45) Date of Patent: Dec. 4, 2018

(54) PERSISTENT CACHE LAYER IN A DISTRIBUTED FILE SYSTEM

(71) Applicant: EMC IP Holding Company, Hopkinton, MA (US)

(72) Inventors: Max Laier, Seattle, WA (US); Evgeny Popovich, Vancouver (CA); Hwanju Kim, Seattle, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 113 days.

(21) Appl. No.: 15/581,337

(22) Filed: Apr. 28, 2017

(51) Int. Cl.
| G06F 12/08 | (2016.01) |
| G06F 12/0893 | (2016.01) |
| G06F 12/0804 | (2016.01) |
| G06F 17/30 | (2006.01) |

(52) U.S. Cl.
CPC ...... *G06F 12/0893* (2013.01); *G06F 12/0804* (2013.01); *G06F 17/30091* (2013.01); *G06F 17/30132* (2013.01); *G06F 17/30194* (2013.01); *G06F 2212/1024* (2013.01); *G06F 2212/163* (2013.01); *G06F 2212/608* (2013.01)

(58) Field of Classification Search
USPC ........................................................ 711/143
See application file for complete search history.

(56) References Cited

U.S. PATENT DOCUMENTS

| 5,349,678 | A  * | 9/1994  | Morris  | G06F 8/60 |
|           |      |         |         | 709/203 |
| 6,694,359 | B1 * | 2/2004  | Morris  | G06F 8/60 |
|           |      |         |         | 709/219 |
| 7,165,079 | B1 * | 1/2007  | Chen    | G06F 17/30067 |
| 7,194,595 | B1 * | 3/2007  | Fair    | G06F 3/0611 |
|           |      |         |         | 707/E17.01 |
| 7,467,276 | B1 * | 12/2008 | Kahn    | G06F 3/0607 |
|           |      |         |         | 711/112 |
| 7,721,062 | B1 * | 5/2010  | Fair    | G06F 11/1435 |
|           |      |         |         | 707/690 |
| 2002/0133491 | A1 * | 9/2002 | Sim  | G06F 17/30067 |
| 2003/0182322 | A1 * | 9/2003 | Manley | G06F 17/30212 |
| 2012/0011340 | A1 * | 1/2012 | Flynn  | G06F 12/0246 |
|              |      |        |        | 711/171 |
| 2012/0084523 | A1 * | 4/2012 | Littlefield | G06F 11/1469 |
|              |      |        |        | 711/162 |
| 2013/0073821 | A1 * | 3/2013 | Flynn  | G06F 3/061 |
|              |      |        |        | 711/162 |
| 2013/0227236 | A1 * | 8/2013 | Flynn  | G11C 16/26 |
|              |      |        |        | 711/165 |
| 2014/0344507 | A1 * | 11/2014 | Piggin | G06F 12/0246 |
|              |      |        |        | 711/103 |

* cited by examiner

*Primary Examiner* — Mano Padmanabhan
*Assistant Examiner* — Jean C Edouard
(74) *Attorney, Agent, or Firm* — Krishnendu Gupta

(57) ABSTRACT

Implementations are provided herein for having at least two data streams associated with each file in a file system. The first, a cache overlay layer, can store additional state information on a per block basis that details whether each individual block of file data within the cache overlay layer is clean, dirty, or indicates that a write back to the storage layer is in progress. The second, a storage layer, can be a use case defined repository that can transform data using data augmentation methods or store unmodified raw data in local storage. File system operations directed to the cache overlay layer can be processed asynchronously from file system operations directed to the storage layer.

20 Claims, 10 Drawing Sheets

PERSISTENT CACHE LAYER IN A DISTRIBUTED FILE SYSTEM

CROSS REFERENCE TO RELATED APPLICATIONS

This application is related to co-pending U.S. patent application Ser. No. 14/501,881 for DATA AND METADATA STRUCTURES FOR USE IN TIERING DATA TO CLOUD STORAGE, which is incorporated herein by reference for all purposes, and to co-pending U.S. patent application Ser. No. 14/501,806 for GARBAGE COLLECTION OF DATA TIERED TO CLOUD STORAGE, which is incorporated herein by reference for all purposes, and to co-pending U.S. patent application Ser. No. 14/501,958 for TIERING DATA TO CLOUD STORAGE USING CLOUD-POOLS AND POLICIES, which is incorporated herein by reference for all purposes, and to co-pending U.S. patent application Ser. No. 14/501,756 for WRITING BACK DATA TO FILES TIERED IN CLOUD STORAGE, which is incorporated herein by reference for all purposes, and to co-pending U.S. patent application Ser. No. 14/501,928 for USING A LOCAL CACHE TO STORE, ACCESS AND MODIFY FILES TIERED TO CLOUD STORAGE, which is incorporated herein by reference for all purposes, and to co-pending U.S. patent application Ser. No. 15/581,370 for USING A PERSISTENT CACHE LAYER TO TIER DATA TO CLOUD STORAGE and filed concurrently herewith, which is incorporated herein by reference for all purposes.

FIELD OF THE INVENTION

This invention relates generally to processing data, and more particularly to transparent mechanisms for storing file data in a file system in more than one location such that file system clients can interact with one set of file data while other file system operations are processed asynchronously on a second set of file data.

BACKGROUND OF THE INVENTION

Distributed file systems offer many compelling advantages in establishing high performance computing environments. One example is the ability to easily expand, even at large scale. Another example is the ability to store different types of data, accessible by different types of clients, using different protocols. In servicing different sets of clients, a distributed file system may offer data services such as compression, encryption, off-site tiering, etc.

In many file systems, each file is associated with a single data stream. For example, a unique inode of the file can store metadata related to the file and block locations within specific storage disks where the file data is stored. When a client or other file system process desire access to a file, the unique inode associated with the file can be determined, and then the inode can be read as part of the processing the file system operation.

When a file system operation targeted to an inode is being processed, the inode itself can be placed under lock conditions, impacting other file system processes that desire access to the same inode. In addition, the size of an inode can be limited, such that when metadata relating to the file the inode is associated with grows too large, it may need to be stored elsewhere. For example, if an inode is associated with a file that has been tiered to an external storage repository, metadata may be generated that describes the location with the external storage repository for different chunks of file data, account information needed to access the external repository, etc.

One method to managing metadata associated with an inode is to store such metadata in user space, flag the inode within the kernel space that user space metadata exists that provides context to the inode, and then whenever a file system process needs to access the inode, the process can consult the user space metadata store for any necessary information to perform the file system operation. However, by keeping so much metadata and logic in user space, it can create inefficiencies and additional process expenses to maintain a separate metadata store in user space that provides further context to kernel space inodes.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In accordance with an aspect, at least two data streams for each file in a file system can be established, wherein a first data stream is associated with a cache overlay layer and a second data stream is associated with a storage layer. A logical inode tree can be established that maps each file in the file system to a cache overlay layer inode and a storage layer inode, wherein the cache overlay layer inode contains metadata identifying a chunk state for each chunk of file data, and wherein the storage layer inode is associated with a data augmentation group. File system operations received from a file system client can be processed using the cache overlay layer asynchronously from processing file system operations directed to the storage layer.

In accordance with another aspect, a read operation can be processed from a file system client by determining the data augmentation group associated with the storage layer inode of the file; transforming a set of file data of the file stored in the storage layer based on the data augmentation group and a set of storage layer metadata referenced by the storage layer inode of the file; and filling the transformed set of file data into the cache overlay from the storage layer.

In accordance with another aspect, a convert-and-store-metadata operation can be processed from a file system client by identifying a set of chunks in the cache overlay inode of the file that have chunk states marked as write-back-in-progress; augmenting the set of chunks based on the data augmentation group associated with the storage layer inode of the file; generating a set of augmentation metadata based on the augmenting; storing the augmented set of chunks and the set of augmentation metadata in the storage layer based on the storage layer inode of the file; and changing the chunk state of the set of chunks to clean The following description and the drawings set forth certain illustrative aspects of the specification. These aspects are indicative, however, of but a few of the various ways in which the principles of the specification may be employed. Other advantages and novel features of the specification will

DETAILED DESCRIPTION

Figure 1:
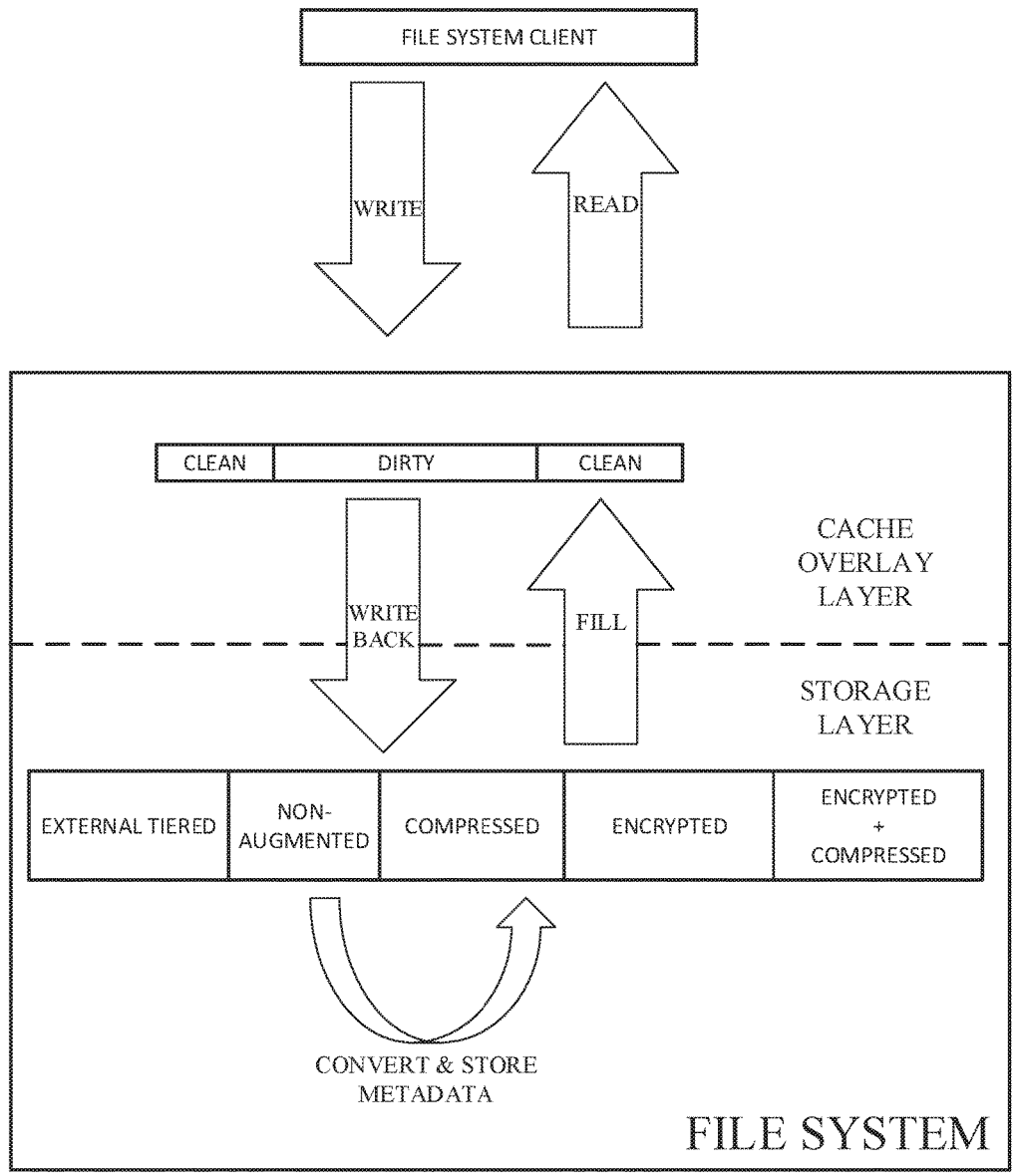
FIG. 1 illustrates an example illustration of data flow between a cache overlay layer and a storage layer in accordance with implementations of this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

As used herein, the term "node" refers to a physical computing device, including, but not limited to, network devices, servers, processors, cloud architectures, or the like. In at least one of the various embodiments, nodes may be arranged in a cluster interconnected by a high-bandwidth, low latency network backplane. In at least one of the various embodiments, non-resident clients may communicate to the nodes in a cluster through high-latency, relatively low-bandwidth front side network connections, such as Ethernet, or the like.

The term "cluster of nodes" refers to one or more nodes that operate together to form a distributed file system. In one example, a cluster of nodes forms a unified namespace for a distributed file system. Nodes within a cluster may communicate information about nodes within the cluster to other nodes in the cluster. Nodes among the cluster of nodes function using the same logical inode number "LIN" mappings that describe the physical location of the data stored within the file system. For example, there can be a LIN to inode addresses mapping where inode addresses describe the physical location of the metadata stored for a file within the file system, and a data tree that maps logical block numbers to the physical location of the data stored. In one implementation, nodes among the cluster of nodes run a common operating system kernel. Clients can connect to any one node among the cluster of nodes and access data stored within the cluster. For example, if a client is connected to a node, and that client requests data that is not stored locally within the node, the node can then load the requested data from other nodes of the cluster in order to fulfill the request of the client. Data protection plans can exist that stores copies or instances of file system data striped across multiple drives in a single node and/or multiple nodes among the cluster of nodes, thereby preventing failures of a node or a storage drive from disrupting access to data by the clients. Metadata, such as inodes, for an entire distributed file system can be mirrored and/or synched across all nodes of the cluster of nodes.

The term "inode" as used herein refers to in-memory representation of on-disk data structures that may store information, or meta-data, about files and directories, such as file size, file ownership, access mode (read, write, execute permissions), time and date of creation and modification, file types, data protection process information such as encryption and/or compression information, snapshot information, hash values associated with location of the file, mappings to cloud data objects, pointers to a cloud metadata objects, etc. In one implementation, inodes may be in a known location in a file system, for example, residing in cache memory for fast and/or efficient access by the file system. In accordance with implementations disclosed herein, separate inodes can exist for the same file, one inode associated with the cache overlay layer and a second inode associated with the storage layer.

A "LIN Tree" is an inode index that stores references to at least a cache overlay inode and a storage overlay inode for each file in the file system. The LIN tree maps a LIN, a unique identifier for a file, to a set of inodes. Before or in conjunction with performing a file system operation on a file or directory, a system call may access the contents of the LIN Tree and find the cache overlay inode and/or the storage overlay inode associated with the file as a part of processing the file system operation.

In some implementations, a data structure explicitly named "inode" or LIN may be absent, but file systems may have data structures that store data similar to LINs and may provide capabilities similar to LINs as described herein. It can be appreciated that the concepts and implementations as provided herein are functional using data structures not termed LINs or inodes but that offer the same functionality to the file system.

A "cache overlay layer" is a logical layer of a file system that is the target for most requests from file system clients. While named a "cache overlay layer", the layer itself is not required to be physically stored in a cache memory or memory cache that typically denote small sections of physical disks with fast access or other special characterizes within a data processing system. It can be appreciated that the cache overlay layer can be stored on any physical media of the local storage system that is accessible by the cluster of nodes, and can be replicated and/or striped across different local storage disks for data redundancy, backup, or other performance purposes.

A "storage overlay layer" is a logical layer of a file system that is a use-case defined repository for each file. Each file can be associated with a storage layer inode that maps the file data to a storage layer protection group. For example, for one file, the storage layer can treat the storage layer inode, and associated file data, like a normal file system file where unmodified raw data is stored on local physical disks mapped and managed by the file system and referenced within the storage layer inode. In another example, the storage layer associated with the storage layer inode can be based a data augmentation method such as compression, encryption, and/or externally tiered, whereby any necessary key values, compression/encryption choices, tiering account data, or other metadata necessary to transform or retrieve the raw data can be stored as metadata within the storage layer protection groups. File system administrators can associate a storage layer inode or a group of storage layer inodes with protection groups that have the appropriate data augmentations for each file.

Implementations are provided herein for having at least two data streams associated with each file in a file system. The first, a cache overlay layer, can store additional state information on a per block basis that details whether each individual block of file data within the cache overlay layer is clean, dirty, or indicates that a write back to the storage layer is in progress. The second, a storage layer, can be a use case defined repository that can transform data using data augmentation methods, tier data to external repositories, or store unmodified raw data in local storage.

In one implementation most client request when interacting with files can be targeted to the cache overlay layer. The cache overlay inode associated with the file can have per-block state information for each block of file data that states whether the block is clean (the block matches the raw data in the storage layer); dirty (the block does not match the raw data in the storage layer); write-back-in-progress (for example, previously labeled dirty data is in the process of being copied into the storage layer); or empty (It is not currently populated with data). It can be appreciated that data can be filled from the storage layer into the cache overlay layer when necessary to process read operations or write operations targeted to the cache overlay layer. The kernel can use metadata associated with the storage layer inode of the file to find the storage layer data of the file, process the data (e.g., decompress, decrypt, retrieve from an external location, etc.) and fill the data into the cache overlay layer. It can be appreciated that file system operations that work to compress, encrypt, tier or perform other data augmentation processes on data stored within the storage layer can be processed asynchronously from processing client requests to the cache overlay layer.

FIG. 1 illustrates an example illustration of data flow between a cache overlay layer and a storage layer in accordance with implementations of this disclosure. The file system client can perform operations (e.g., reads and writes as depicted in FIG. 1) that are targeted to a file. Using the LIN tree, a process can find the cache overlay inode and the storage layer inode associated with the file. The operations can proceed using the cache overlay inode. As stated above, the cache overlay inode can contain per-block state information associated with the data of the file. As shown on FIG. 1, the file data in the cache overlay layer shows some blocks of the file marked as clean, and some marked as dirty.

It can be appreciated that depending on the operation being requested by the file system client, the cache overlay layer may need to fill data from the storage layer into the cache overlay layer to process the operation. For example, if the file system client is requesting to read data that is currently empty in the cache overlay layer, a process can be started to fill data from the storage overlay layer into the cache overlay layer for the requested blocks. Using the storage layer inode that is associated with the file inode, the kernel can identify if any augmentation process has been applied to data that is referenced by the storage layer inode, and then retrieve and/or transform the data as necessary before it is filled into the cache overlay layer.

In one example, non-augmented data can be stored in the storage layer of the file system. For example, the storage layer inode can contain the block locations within local storage where the non-augmented data is stored. In another example, the cache overlay layer can be targeted to faster access memory while the storage layer can be targeted to local storage that has slower to access storage drives.

In another example, raw file data can be compressed within the storage layer. The storage layer inode can be associated with a protection group that provides for compression of file data. Metadata stored within the storage layer inode can contain references to the compression algorithm used to compress and/or decompress the file data. When a file system operation operates to fill compressed data from the storage layer into the cache overlay layer, the metadata within the storage layer inode can be used in uncompressing the data from the storage layer before storing it in the cache overlay layer for access by file system clients. When a file system operation operates to write data back into the storage layer, the storage layer inode can be used to compress the data from the cache overlay layer before storing it within the storage overlay layer.

In another example, raw file data can be encrypted within the storage layer. The storage layer inode can be associated with a protection group that provides for encryption of file data. Metadata stored within the storage layer inode can contain references to the encryption algorithm used to encrypt the data and/or decrypt the data. For example, a key-value pair associated with an encryption algorithm can be stored within the storage layer inode. When a file system operation operates to fill encrypted data from the storage layer into the cache overlay layer, the metadata within the storage layer inode can be used to decrypt the data from the storage layer before storing it in the cache overlay layer for access by file system clients. When a file system operation operates to write data back into the storage layer, the storage layer inode can be used to encrypt the data from the cache overlay layer before storing it within the storage overlay layer.

In another example, raw file data can be tiered to external storage. The storage layer inode can be associated with a protection group that provides for tiering of file data. Metadata stored within the storage layer inode can contain references to an external storage location, an external storage account, checksum information, cloud object mapping information, cloud metadata objects ("CMO's"), cloud date objects ("CDO's"), etc. When a file system operation operates to fill data stored in an external storage location form the storage layer into the cache overlay layer, the metadata within the storage layer inode can be used to retrieve the data from the external storage location and then storing the retrieved data in the cache overlay layer for access by file system clients. When a file system operation operates to write data back into the storage layer, the storage layer inode can be used to store necessary metadata generated from storing a new data object in an external storage location, and then tier the data from the cache storage overlay layer to the external storage location in conjunction with storing the metadata within the storage overlay layer inode.

In another example, a file can be at least two of compressed, encrypted, or tiered to cloud storage where any necessary metadata required to accomplish the combination, as referenced above individually, is stored within the storage overlay inode.

It can be appreciated that in some implementations, the kernel can understand what parts of the storage layer are in what state, based at least in part on protection group information and storage layer inode information, and can handle data transformations without having to fall back to user-space logic.

Figure 2:
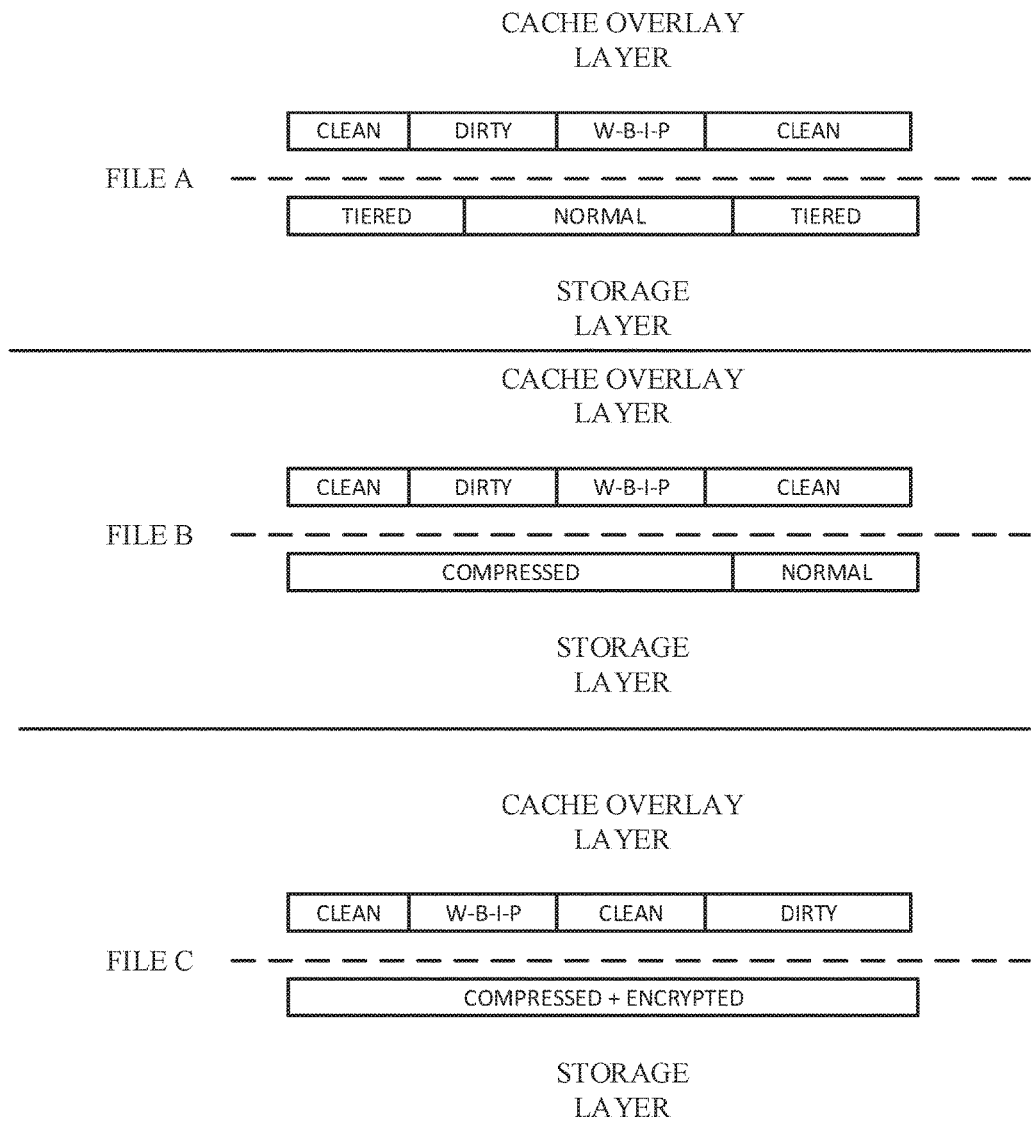
FIG. 2 illustrates three example files having separate data streams for a cache overlay layer and a storage layer in accordance with implementations of this disclosure.

FIG. 2 illustrates three example files having separate data streams for a cache overlay layer and a storage layer in accordance with implementations of this disclosure.

File A is associated with a unique file LIN that references both a unique cache overlay layer inode and a unique storage layer inode. The cache overlay inode contains per block state information that describes four sections of block file data: A first clean section, a dirty section, a section marked write-back-in-progress, and a second clean section. The storage overlay layer inode references three sections of file data, a first and third section whereby the file data has been tiered to an external storage location, and a second section that exists as normal storage with the storage layer. It can be appreciated that as operations to the storage layer can be processed asynchronously from the cache overlay layer, the storage layer data, as depicted, could be in the middle of a process that is tiering all file data to cloud storage, where the second section has yet to be tiered. It can also be appreciated that metadata stored within the storage layer inode of File A can describe any necessary external tier information that can locate the data in the external storage location such as a CDO or CMO information as referenced in the incorporated references.

File B is also associated with its own unique LIN that references both a unique cache overlay layer inode and a unique storage layer inode. The cache overlay inode contains per block state information that describes four sections of block file data: A first clean section, a dirty section, a section marked write-back-in-progress, and a second clean section. The storage layer inode references two sections of file data, a first section that is compressed, and a second section that is normal non-augmented file data.

File C is also associated with its own unique LIN that references both a unique cache overlay layer inode and a unique storage layer inode. The cache overlay inode contains per block state information that describes four sections of block file data: A first clean section, a section marked write-back-in-progress, a second clean section and a second dirty section. The storage layer inode references a single section of file data that is both compressed and encrypted.

FIGS. 3-8 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

Figure 3:
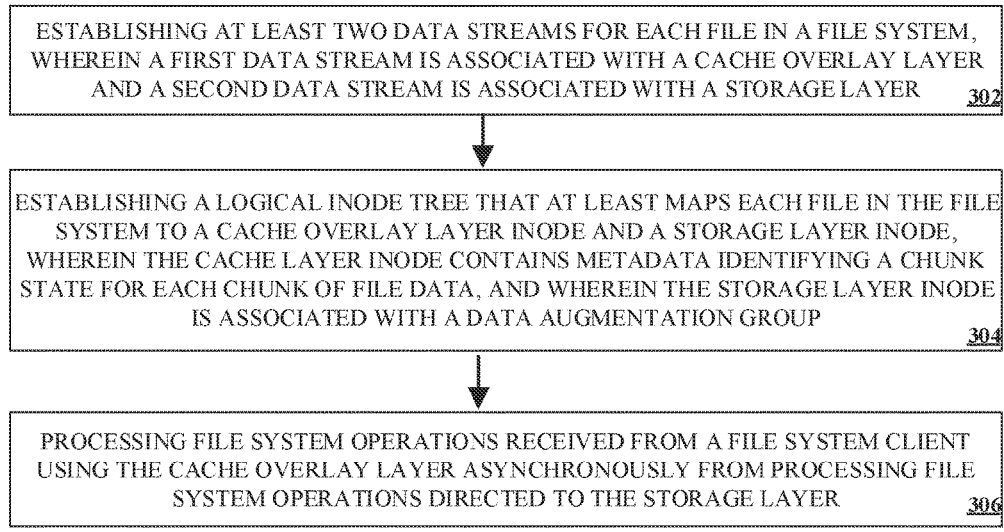
FIG. 3 illustrates an example flow diagram method for establishing a cache overlay layer and a storage layer within a file system in accordance with implementations of this disclosure.

Referring now to FIG. 3, there is illustrated an example flow diagram method for establishing a cache overlay layer and a storage layer within a file system in accordance with implementations of this disclosure.

At 302, at least two data streams can be established for each file in a file system, wherein a first data stream is associated with a cache overlay layer and a second data stream is associated with a storage layer.

At 304, a logical inode tree can be established that at least maps each file in the file system to a cache overlay layer inode and a storage layer inode, wherein the cache layer inode contains metadata identifying a chunk state for each chunk of file data, and wherein the storage layer inode is associated with a data augmentation group. In one implementation, the data augmentation group is compression. In one implementation, the data augmentation group is encryption. In one implementation, the data augmentation group targets the data for low performance storage. In one implementation, the data augmentation group is externally tiering, as more specifically discussed with regard to FIGS. 6-8.

At 306, file system operations received from a file system client using the cache overlay layer can be processed asynchronously from processing file system operations directed to the storage layer.

Figure 4:
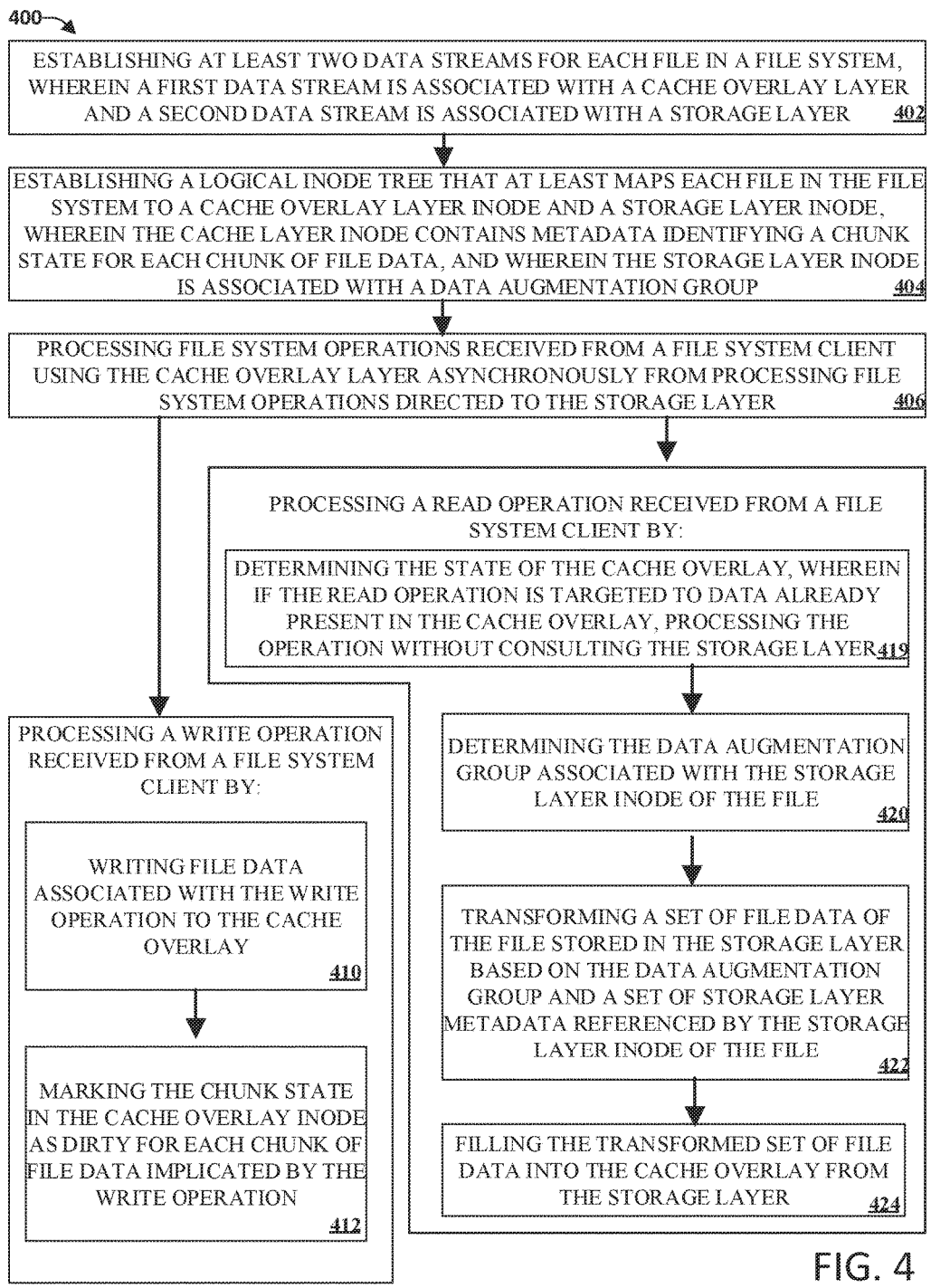
FIG. 4 illustrates an example flow diagram method for using a cache overlay layer and a storage layer to process a write operation and a read operation in accordance with implementations of this disclosure.

Referring now to FIG. 4, there is illustrated an example flow diagram method for using a cache overlay layer and a storage layer to process a write operation and a read operation in accordance with implementations of this disclosure.

At 402, at least two data streams can be established for each file in a file system, wherein a first data stream is associated with a cache overlay layer and a second data stream is associated with a storage layer.

At 404, a logical inode tree can be established that at least maps each file in the file system to a cache overlay layer inode and a storage layer inode, wherein the cache layer inode contains metadata identifying a chunk state for each chunk of file data, and wherein the storage layer inode is associated with a data augmentation group.

At 406, file system operations received from a file system client using the cache overlay layer can be processed asynchronously from processing file system operations directed to the storage layer.

Steps 410-412 can be performed in response to processing a write operation received from a file system client. In one implementation, steps 410-412 can be performed in s a single transaction. At step 410, file data associated with the write request can be written to the cache overlay. At 412, the chunk state in the cache overlay inode of the file can be marked as dirty for each chunk of file data implicated by the write operation.

Steps 419-424 can be performed in response to processing a read operation received from a file system client. At 419, the state of the cache overlay can be determined, wherein if the read operation is targeted to data already present in the cache overlay, the read operation can be processed without consulting the storage layer. At step 420, the data augmentation group associated with the storage layer inode of the file can be determined. At 422, the set of file data of the file stored in the storage layer can be transformed based on the data augmentation group and a set of storage layer metadata referenced by the storage layer inode of the file. In one implementation, the set of storage layer metadata is stored within the storage layer inode. At 424, the transformed set of file data can be filled into the cache overlay storage layer. In one implementation, the chunk states in the cache overlay inode of the file can be changed to clean in response to filling the cache overlay layer in step 424.

Figure 5:
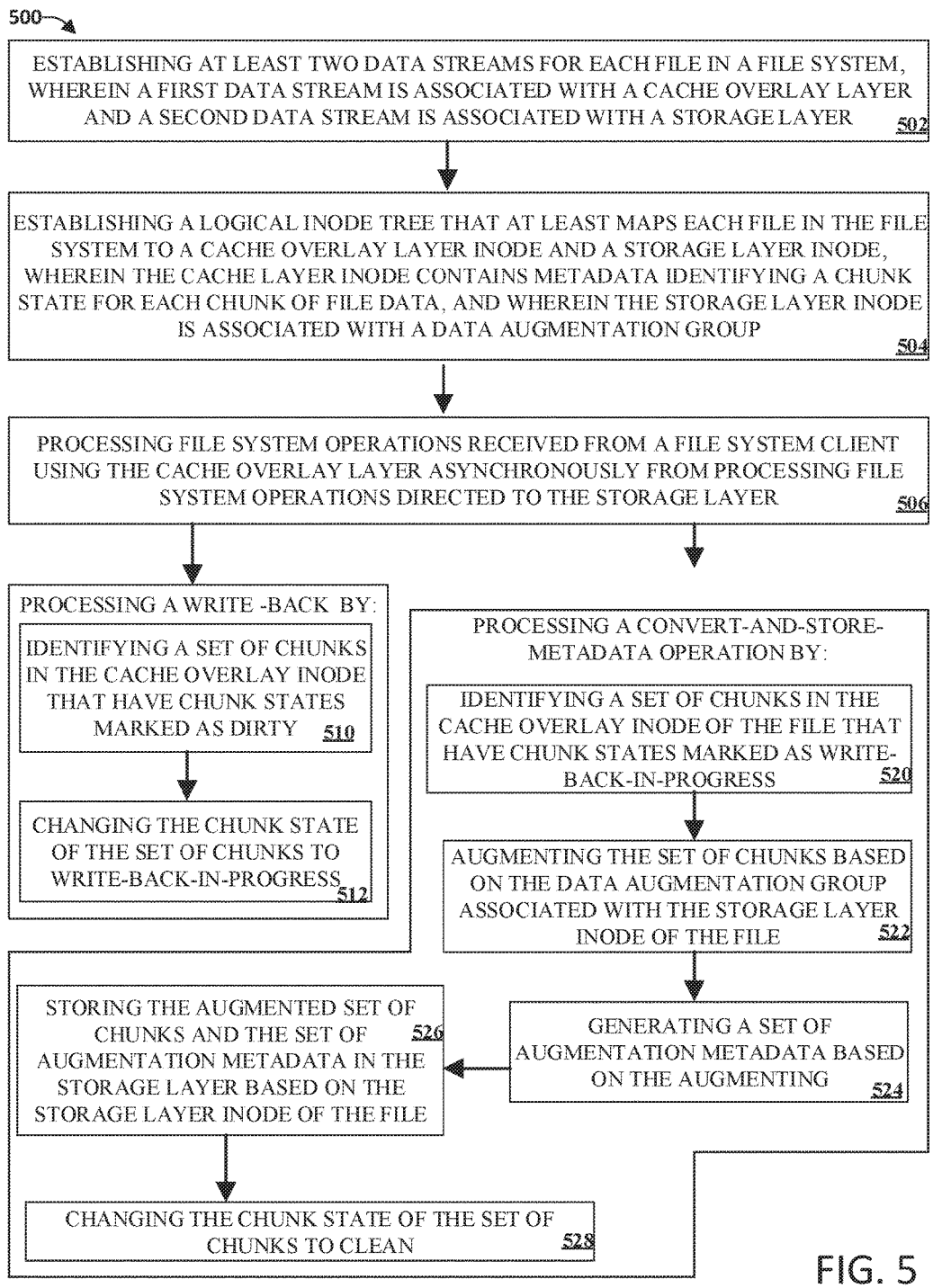
FIG. 5 illustrates an example flow diagram method for using a cache overlay layer and a storage layer to process a write-back operation and a convert-and-store-metadata operation in accordance with implementations of this disclosure.

Referring now to FIG. 5, there is illustrated an example flow diagram method for using a cache overlay layer and a storage layer to process a write-back operation and a convert-and-store-metadata operation in accordance with implementations of this disclosure. At 502, at least two data streams can established for each file in a file system, wherein a first data stream is associated with a cache overlay layer and a second data stream is associated with a storage layer.

At 504, a logical inode tree can be established that at least maps each file in the file system to a cache overlay layer inode and a storage layer inode, wherein the cache layer inode contains metadata identifying a chunk state for each chunk of file data, and wherein the storage layer inode is associated with a data augmentation group.

At 506, file system operations received from a file system client using the cache overlay layer can be processed asynchronously from processing file system operations directed to the storage layer.

Steps 510-512 can be performed in response to processing a write-back operation. It can be appreciated that this can be performed asynchronously from client file system operations. At step 510, a set of chunks in the cache overlay inode that have been marked as dirty can be identified. At 511, not pictured, the data associated with the set of chunks identified at step 510 can be returned for future convert-and-store metadata processing. At 512, the chunk state of the set of chunks identified at step 510 can be changed to write-back-in-progress. It can be appreciated that steps 510-512 can be performed in a single transaction.

Steps 520-528 can be performed in response to processing a convert-and-store-metadata operation. It can be appreciated that this can be performed asynchronously from client file system operations. At 520, a set of chunks in the cache overlay inode of the file that have chunk states marked as write-back-in-progress can be identified. At 522, the set of chunks identified at 520 can be augmented based on the data augmentation group associated with the storage layer inode of the file. At 524, a set of augmentation metadata can be generated based on the augmenting that took place at step 522. At step 526, the augmented set of chunks and the set of augmented metadata can be stored in the storage layer based on the storage layer inode of the file. At 528, the chunk state of the set of chunks can be changed to clean in the cache overlay inode. It can be appreciated that steps 520-528 can be performed in a single transaction.

Figure 6:
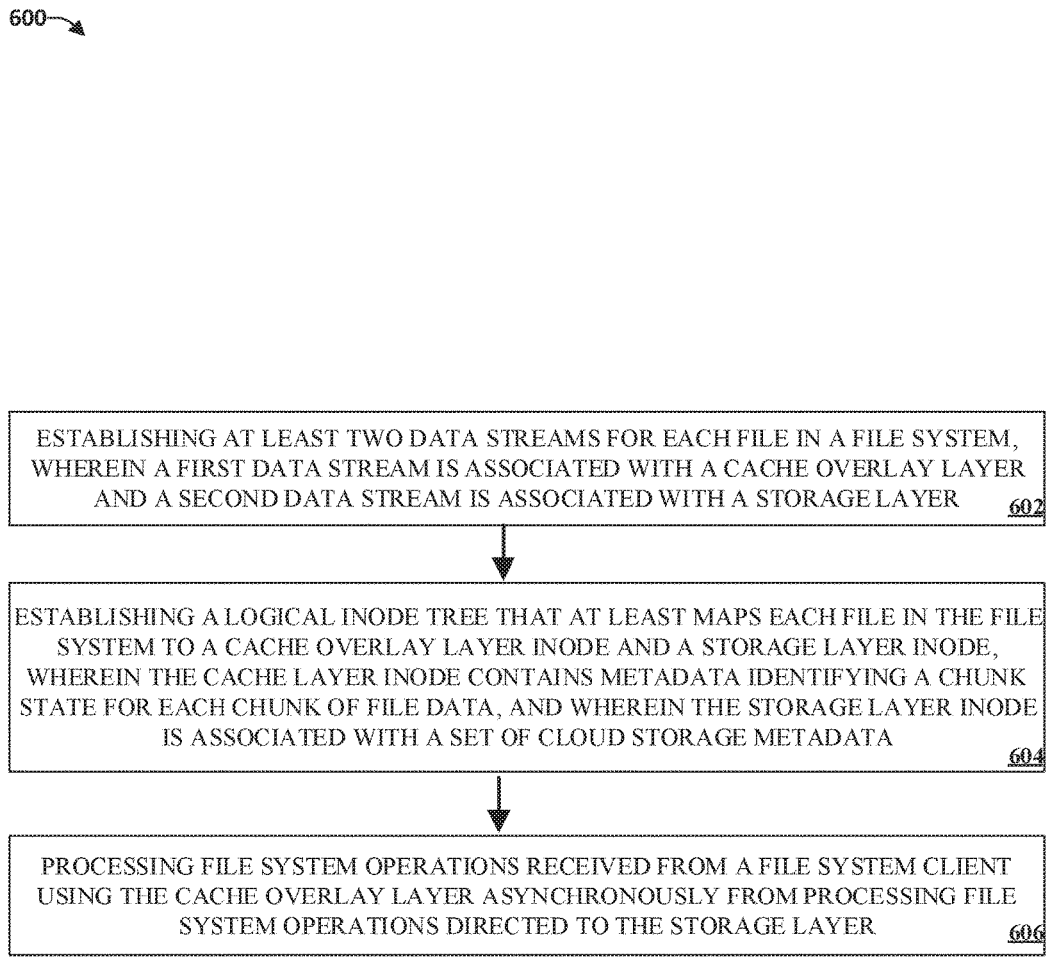
FIG. 6 illustrates an example flow diagram method for establishing a cache overlay layer and a storage layer within a file system to tier data to cloud storage in accordance with implementations of this disclosure.

Referring now to FIG. 6, there is illustrated an example flow diagram method for establishing a cache overlay layer and a storage layer within a file system to tier data to cloud storage in accordance with implementations of this disclosure. At 602, at least two data streams can established for each file in a file system, wherein a first data stream is associated with a cache overlay layer and a second data stream is associated with a storage layer.

At 604, a logical inode tree can be established that at least maps each file in the file system to a cache overlay layer inode and a storage layer inode, wherein the cache layer inode contains metadata identifying a chunk state for each chunk of file data, and wherein the storage layer inode is associated with a set of cloud storage metadata. In one implementation, the cloud storage metadata can contain a cloud metadata object, references to a set of cloud data objects, a cloud object index. In one implementation, the account login credentials for the cloud storage account can be contained within the cloud storage metadata.

At 606, file system operations received from a file system client using the cache overlay layer can be processed asynchronously from processing file system operations directed to the storage layer.

Figure 7:
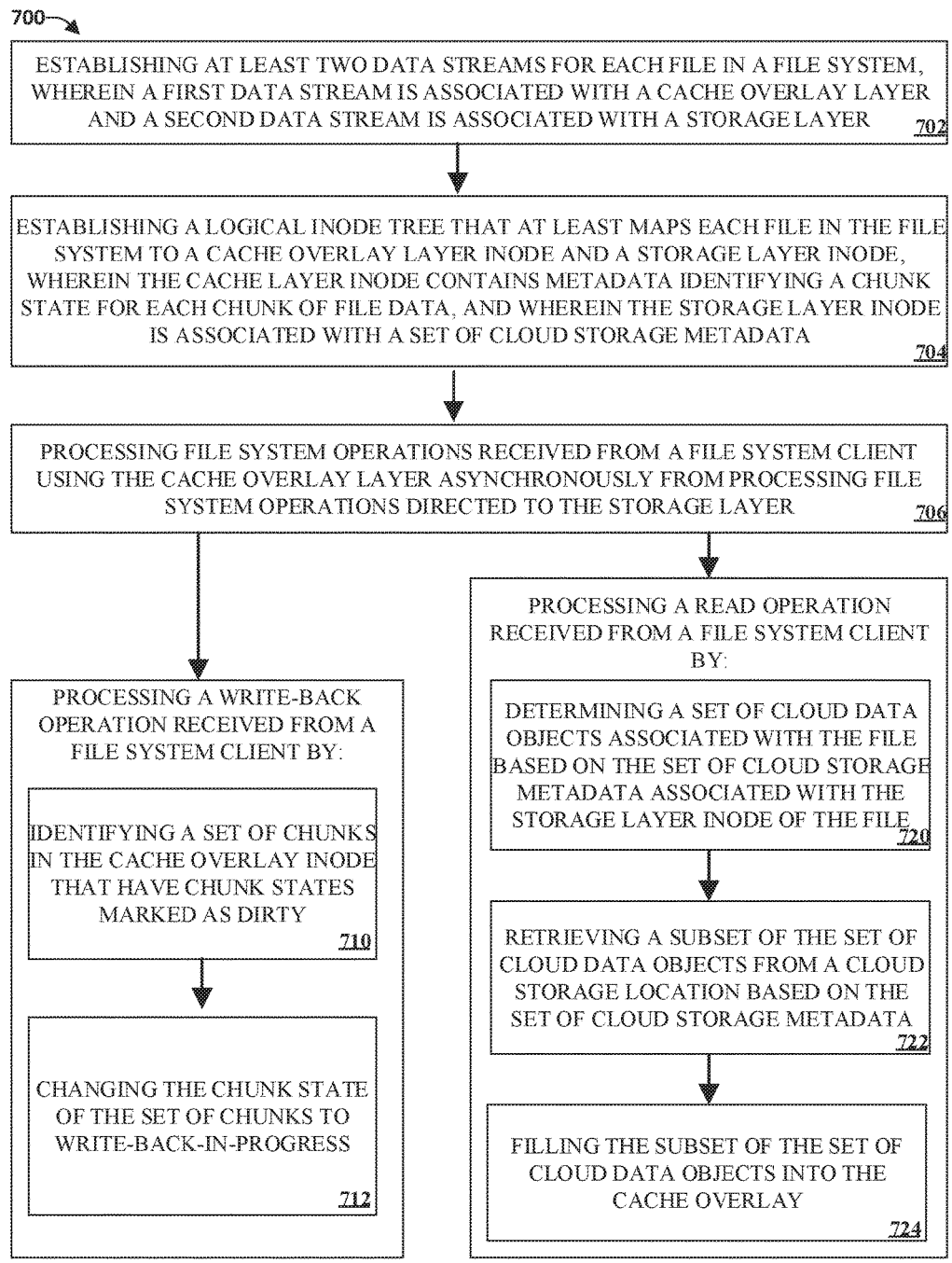
FIG. 7 illustrates an example flow diagram method for using a cache overlay layer and a storage layer within a file system to tier data to cloud storage, including processing a convert-and-store-metadata operation in accordance with implementations of this disclosure.

Referring now to FIG. 7, there is illustrated an example flow diagram method for using a cache overlay layer and a storage layer within a file system to tier data to cloud storage, including processing a convert-and-store-metadata operation in accordance with implementations of this disclosure. At 702, at least two data streams can established for each file in a file system, wherein a first data stream is associated with a cache overlay layer and a second data stream is associated with a storage layer.

At 704, a logical inode tree can be established that at least maps each file in the file system to a cache overlay layer inode and a storage layer inode, wherein the cache layer inode contains metadata identifying a chunk state for each chunk of file data, and wherein the storage layer inode is associated with a set of cloud storage metadata.

At 706, file system operations received from a file system client using the cache overlay layer can be processed asynchronously from processing file system operations directed to the storage layer.

Steps 710-712 can be performed in response to processing a write-back operation received from a file system client. At step 710, a set of chunks in the cache overlay inode that have chunk states marked as dirty can be identified. At 712, the chunk state of the set of chunks can be changed to write-back-in-progress.

Steps 720-424 can be performed in response to processing a read operation received from a file system client. At 720, a set of cloud data objects associated with the file can be determined based on the set of cloud storage metadata associated with the storage layer inode of the file. For example, offsets with the file data can be associated with offsets within cloud data objects such that it can be determined what specific cloud data objects need to be retrieved to fill the cache overlay with the requested data. At 722, a subset of the set of cloud data objects can be retrieved from a cloud storage location based on the set of cloud storage metadata. For example, every cloud data object may need to be retrieved, or alternatively, a smaller subset that only encompasses cloud data objects needed to fill the cache overlay with clean data. At 724, the subset of the set of cloud data objects can be filled into the cache overlay. In one implementation, in response to the set of cloud data objects being filled into the cache overlay, the set of chunks in the cache overlay inode associated with the filling can be marked as clean. In one implementation, in response to retrieving the subset of the set of cloud data objects, the subset of the set of cloud objects retrieved can be decrypted and/or decompressed.

Figure 8:
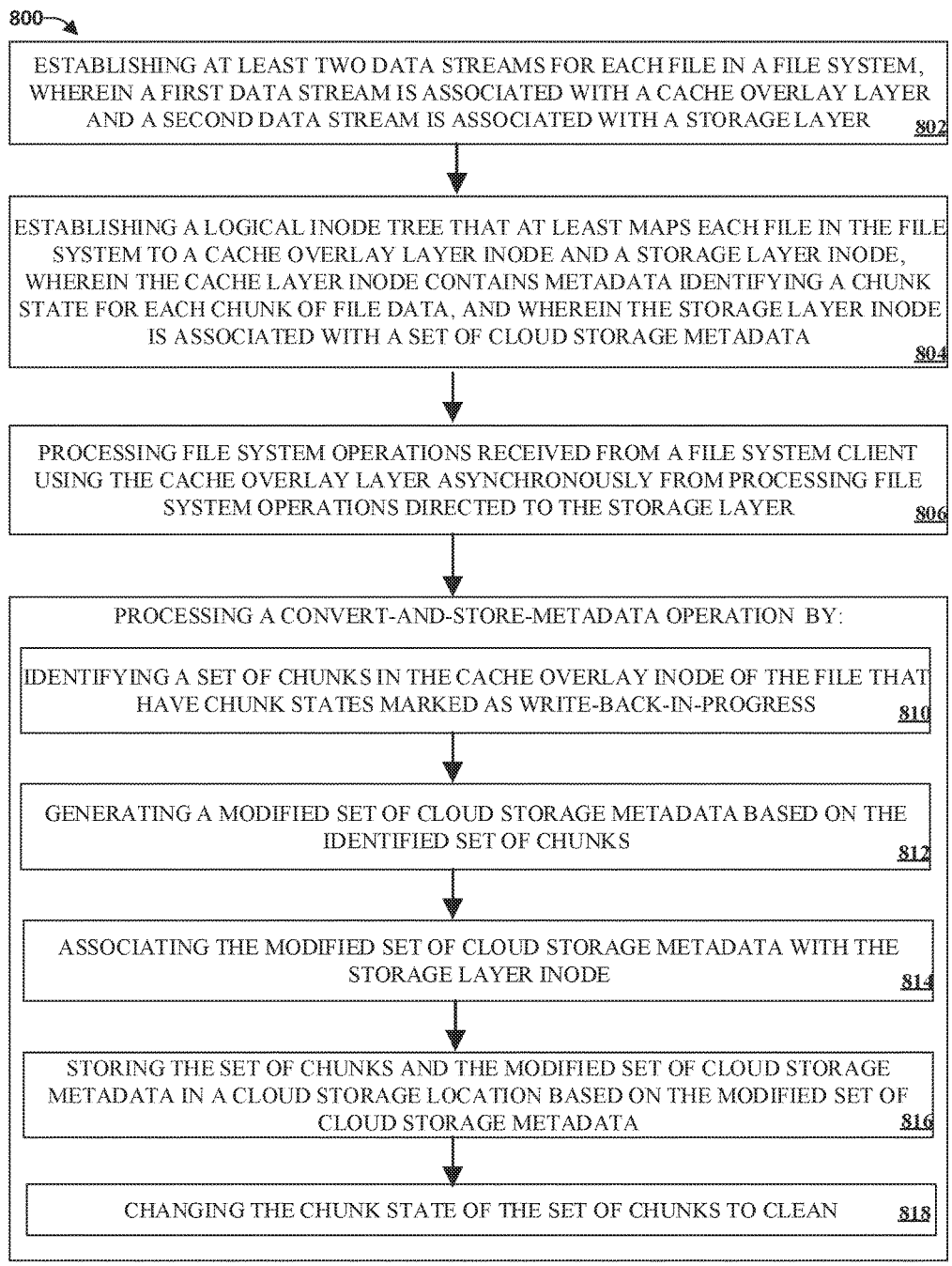
FIG. 8 illustrates an example flow diagram method for using a cache overlay layer and a storage layer within a file system to tier data to cloud storage, including processing a write-back operation and a read operation in accordance with implementations of this disclosure.

Referring now to FIG. 8, there is illustrated an example flow diagram method for using a cache overlay layer and a storage layer within a file system to tier data to cloud storage, including processing a write-back operation and a read operation in accordance with implementations of this disclosure. At 802, at least two data streams can established for each file in a file system, wherein a first data stream is associated with a cache overlay layer and a second data stream is associated with a storage layer.

At 804, a logical inode tree can be established that at least maps each file in the file system to a cache overlay layer inode and a storage layer inode, wherein the cache layer inode contains metadata identifying a chunk state for each chunk of file data, and wherein the storage layer inode is associated with a set of cloud storage metadata.

At 806, file system operations received from a file system client using the cache overlay layer can be processed asynchronously from processing file system operations directed to the storage layer.

Steps 810-818 can be performed in response to processing a convert-and-store-metadata operation.

At 810, a set of chunks in the cache overlay inode of the file that have chunk states marked as write-back-in-progress can be identified.

At 812, a modified set of cloud storage metadata can be generated based on the identified set of chunks. For example, the cloud account associated with the protection group that the storage overlay inode belongs to can be added to the set of cloud storage metadata. In another example, references to new cloud data objects and their associated identifiers that will be created when data is tiered to the cloud. A modified CMO can be generated. A modified COI can be generated.

At 814, the modified set of cloud storage metadata can be associated with the storage layer inode. In one implementation, the modified set of cloud storage metadata can be stored within the storage layer inode.

At 816, the set of chunks and the modified set of cloud storage metadata can be stored in a cloud storage location based on the modified set of cloud storage metadata.

At 818, the chunk state of the set of chunks can be set to clean.

Figure 9:
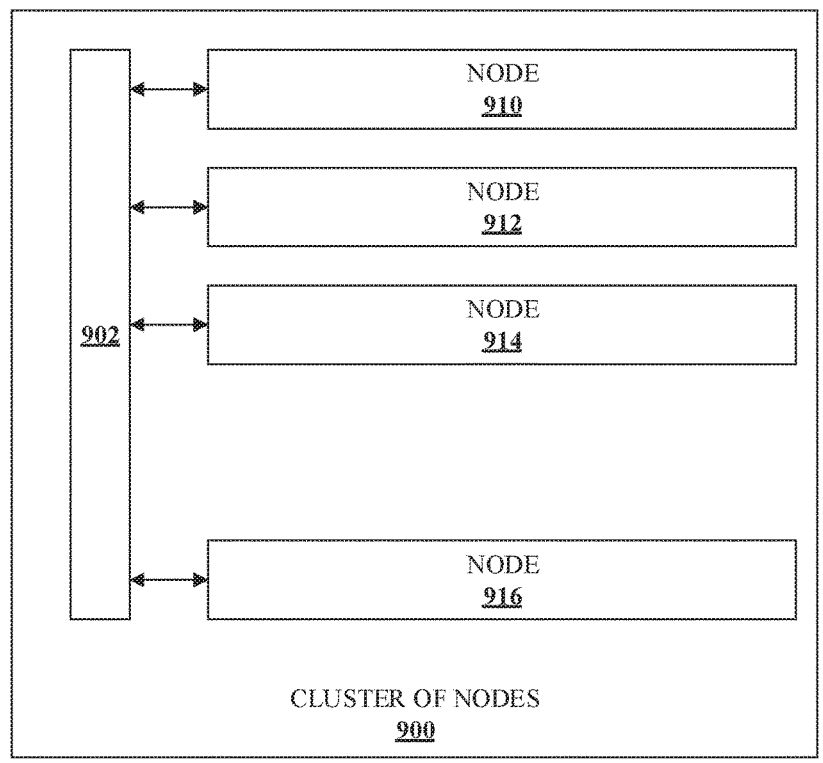
FIG. 9 illustrates an example block diagram of a cluster of nodes in accordance with implementations of this disclosure.

FIG. 9 illustrates an example block diagram of a cluster of nodes in accordance with implementations of this disclosure. However, the components shown are sufficient to disclose an illustrative implementation. Generally, a node is a computing device with a modular design optimized to minimize the use of physical space and energy. A node can include processors, power blocks, cooling apparatus, network interfaces, input/output interfaces, etc. Although not shown, a cluster of nodes typically includes several computers that merely require a network connection and a power cord connection to operate. Each node computer often includes redundant components for power and interfaces. The cluster of nodes 900 as depicted shows Nodes 910, 912, 914 and 916 operating in a cluster; however, it can be appreciated that more or less nodes can make up a cluster. It can be further appreciated that nodes among the cluster of nodes do not have to be in a same enclosure as shown for ease of explanation in FIG. 9, and can be geographically disparate. Backplane 902 can be any type of commercially available networking infrastructure that allows nodes among the cluster of nodes to communicate amongst each other in as close to real time as the networking infrastructure allows. It can be appreciated that the backplane 902 can also have a separate power supply, logic, I/O, etc. as necessary to support communication amongst nodes of the cluster of nodes.

It can be appreciated that the Cluster of Nodes 900 can be in communication with a second Cluster of Nodes and work in conjunction to provide a distributed file system. Nodes can refer to a physical enclosure with a varying amount of CPU cores, random access memory, flash drive storage, magnetic drive storage, etc. For example, a single Node could contain, in one example, 36 disk drive bays with attached disk storage in each bay. It can be appreciated that nodes within the cluster of nodes can have varying configurations and need not be uniform.

Figure 10:
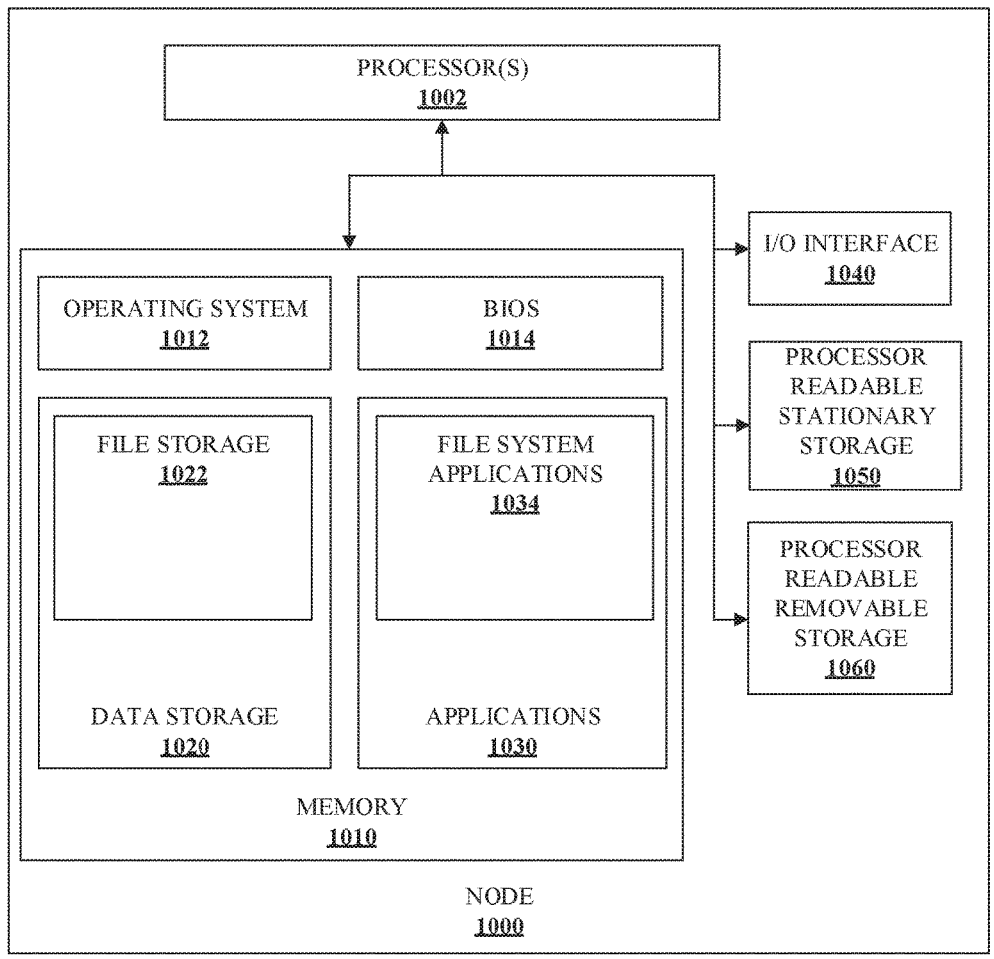
FIG. 10 illustrates an example block diagram of a node in accordance with implementations of this disclosure.

FIG. 10 illustrates an example block diagram of a node 1000 in accordance with implementations of this disclosure.

Node 1000 includes one or more processor 1002 which communicates with memory 1010 via a bus. Node 1000 also includes input/output interface 1040, processor-readable stationary storage device(s) 1050, and processor-readable removable storage device(s) 1060. Input/output interface 1040 can enable node 1000 to communicate with other nodes, mobile devices, network devices, and the like. Processor-readable stationary storage device 1050 may include one or more devices such as an electromagnetic storage device (hard disk), solid state hard disk (SSD), hybrid of both an SSD and a hard disk, and the like. In some configurations, a node may include many storage devices. Also, processor-readable removable storage device 1060 enables processor 1002 to read non-transitive storage media for storing and accessing processor-readable instructions, modules, data structures, and other forms of data. The non-transitive storage media may include Flash drives, tape media, floppy media, disc media, and the like.

Memory 1010 may include Random Access Memory (RAM), Read-Only Memory (ROM), hybrid of RAM and ROM, and the like. As shown, memory 1010 includes operating system 1012 and basic input/output system (BIOS) 1014 for enabling the operation of node 1000. In various embodiments, a general-purpose operating system may be employed such as a version of UNIX™ LINUX™, a specialized server operating system such as Microsoft's Windows Server™ and Apple Computer's IoS Server™, or the like.

Applications 1030 may include processor executable instructions which, when executed by node 1000, transmit, receive, and/or otherwise process messages, audio, video, and enable communication with other networked computing devices. Examples of application programs include database servers, file servers, calendars, transcoders, and so forth. File System Applications 1034 may include, for example, metadata applications, and other file system applications according to implementations of this disclosure.

Human interface components (not pictured), may be remotely associated with node 1000, which can enable remote input to and/or output from node 1000. For example, information to a display or from a keyboard can be routed through the input/output interface 1040 to appropriate peripheral human interface components that are remotely located. Examples of peripheral human interface components include, but are not limited to, an audio interface, a display, keypad, pointing device, touch interface, and the like.

Data storage 1020 may reside within memory 1010 as well, storing file storage 1022 data such as metadata or file data. It can be appreciated that file data and/or metadata can relate to file storage within processor readable stationary storage 1050 and/or processor readable removable storage 1060 and/or externally tiered storage locations (not pictured) that are accessible using I/O interface 1040. For example, file data may be cached in memory 1010 for faster or more efficient frequent access versus being stored within processor readable stationary storage 1050. In addition, Data storage 1020 can also host policy data 1024 such as sets of policies applicable to different access zone in accordance with implementations of this disclosure. Index and table data can be stored as files in file storage 1022.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A method comprising:
   establishing at least two data streams for each file in a file system, wherein a first data stream is associated with a cache overlay layer and a second data stream is associated with a storage layer;
   establishing a logical inode tree that at least maps each file in the file system to a cache overlay layer inode and a storage layer inode, wherein the cache overlay layer inode contains metadata identifying a chunk state for each chunk of file data, and wherein the storage layer inode is associated with a data augmentation group; and
   processing file system operations received from a file system client using the cache overlay layer asynchronously from processing file system operations directed to the storage layer.

2. The method of claim 1, wherein the data augmentation group is compression, and wherein the second data stream is compressed in the storage layer.

3. The method of claim 1, wherein the data augmentation group is encryption, and wherein the second data stream is encrypted in the storage layer.

4. The method of claim 1, wherein processing file system operations received from the file system client includes processing a write operation, wherein processing the write operation includes:
   writing file data associated with the write operation to the cache overlay; and
   marking the chunk state in the cache overlay inode as dirty for each chunk of file data implicated by the write operation.

5. The method of claim 1, wherein processing file system operations received from the file system client includes processing a read operation targeted to a file, wherein processing the read operation includes:
   determining the data augmentation group associated with the storage layer inode of the file;
   transforming a set of file data of the file stored in the storage layer based on the data augmentation group and a set of storage layer metadata referenced by the storage layer inode of the file; and
   filling the transformed set of file data into the cache overlay from the storage layer.

6. The method of claim 1, wherein processing file system operations includes processing a write-back operation, wherein processing the write-back operation includes:
   identifying a set of chunks in the cache overlay inode that have chunk states marked as dirty; and
   changing the chunk state of the set of chunks to write-back-in-progress.

7. The method of claim 1, wherein processing file system operations includes processing a convert-and-store-metadata operation for a file, wherein processing the convert-and-store-metadata operation includes:
   identifying a set of chunks in the cache overlay inode of the file that have chunk states marked as write-back-in-progress;
   augmenting the set of chunks based on the data augmentation group associated with the storage layer inode of the file;
   generating a set of augmentation metadata based on the augmenting;
   storing the augmented set of chunks and the set of augmentation metadata in the storage layer based on the storage layer inode of the file; and
   changing the chunk state of the set of chunks to clean.

8. A system comprising at least one storage device and at least one hardware processor configured to:
   establish at least two data streams for each file in a file system, wherein a first data stream is associated with a cache overlay layer and a second data stream is associated with a storage layer;
   establish a logical inode tree that at least maps each file in the file system to a cache overlay layer inode and a storage layer inode, wherein the cache overlay layer inode contains metadata identifying a chunk state for each chunk of file data, and wherein the storage layer inode is associated with a data augmentation group; and
   process file system operations received from a file system client using the cache overlay layer asynchronously from processing file system operations directed to the storage layer.

9. The system of claim 8, wherein the data augmentation group is compression, and wherein the second data stream is compressed in the storage layer.

10. The system of claim 8, wherein the data augmentation group is encryption, and wherein the second data stream is encrypted in the storage layer.

11. The system of claim 8, further configured to:
process a write operation received from the file system client, and wherein processing the write operation includes:
  writing file data associated with the write operation to the cache overlay; and
  marking the chunk state in the cache overlay inode as dirty for each chunk of file data implicated by the write operation.

12. The system of claim 8, further configured to:
process a read operation received from the file system client targeted to a file, wherein processing the read operation includes:
  determining the data augmentation group associated with the storage layer inode of the file;
  transforming a set of file data of the file stored in the storage layer based on the data augmentation group and a set of storage layer metadata referenced by the storage layer inode of the file; and
  filling the transformed set of file data into the cache overlay from the storage layer.

13. The system of claim 8, further configured to:
process a write-back operation, wherein processing the write-back operation includes:
  identifying a set of chunks in the cache overlay inode that have chunk states marked as dirty; and
  changing the chunk state of the set of chunks to write-back-in-progress.

14. The system of claim 8, further configured to:
process a convert-and-store-metadata operation for a file, wherein processing the convert-and-store-metadata operation includes:
  identifying a set of chunks in the cache overlay inode of the file that have chunk states marked as write-back-in-progress;
  augmenting the set of chunks based on the data augmentation group associated with the storage layer inode of the file;
  generating a set of augmentation metadata based on the augmenting;
  storing the augmented set of chunks and the set of augmentation metadata in the storage layer based on the storage layer inode of the file; and
  changing the chunk state of the set of chunks to clean.

15. A non-transitory computer readable medium with program instructions stored thereon to perform the following acts:
establishing at least two data streams for each file in a file system, wherein a first data stream is associated with a cache overlay layer and a second data stream is associated with a storage layer;
establishing a logical inode tree that at least maps each file in the file system to a cache overlay layer inode and a storage layer inode, wherein the cache overlay layer inode contains metadata identifying a chunk state for each chunk of file data, and wherein the storage layer inode is associated with a data augmentation group; and
processing file system operations received from a file system client using the cache overlay layer asynchronously from processing file system operations directed to the storage layer.

16. The non-transitory computer readable medium of claim 15, wherein the data augmentation group is compression, and wherein the second data stream is compressed in the storage layer.

17. The non-transitory computer readable medium of claim 15, wherein the data augmentation group is encryption, and wherein the second data stream is encrypted in the storage layer.

18. The non-transitory computer readable medium of claim 15, wherein processing file system operations received from the file system client includes processing a write operation, wherein processing the write operation includes:
  writing file data associated with the write operation to the cache overlay; and
  marking the chunk state in the cache overlay inode as dirty for each chunk of file data implicated by the write operation.

19. The non-transitory computer readable medium of claim 15, wherein processing file system operations includes processing a write-back operation, wherein processing the write-back operation includes:
  identifying a set of chunks in the cache overlay inode that have chunk states marked as dirty; and
  changing the chunk state of the set of chunks to write-back-in-progress.

20. The non-transitory computer readable medium of claim 15, wherein processing file system operations includes processing a convert-and-store-metadata operation for a file, wherein processing the convert-and-store-metadata operation includes:
  identifying a set of chunks in the cache overlay inode of the file that have chunk states marked as write-back-in-progress;
  augmenting the set of chunks based on the data augmentation group associated with the storage layer inode of the file;
  generating a set of augmentation metadata based on the augmenting;
  storing the augmented set of chunks and the set of augmentation metadata in the storage layer based on the storage layer inode of the file; and
  changing the chunk state of the set of chunks to clean.

* * * * *